Figure 1:
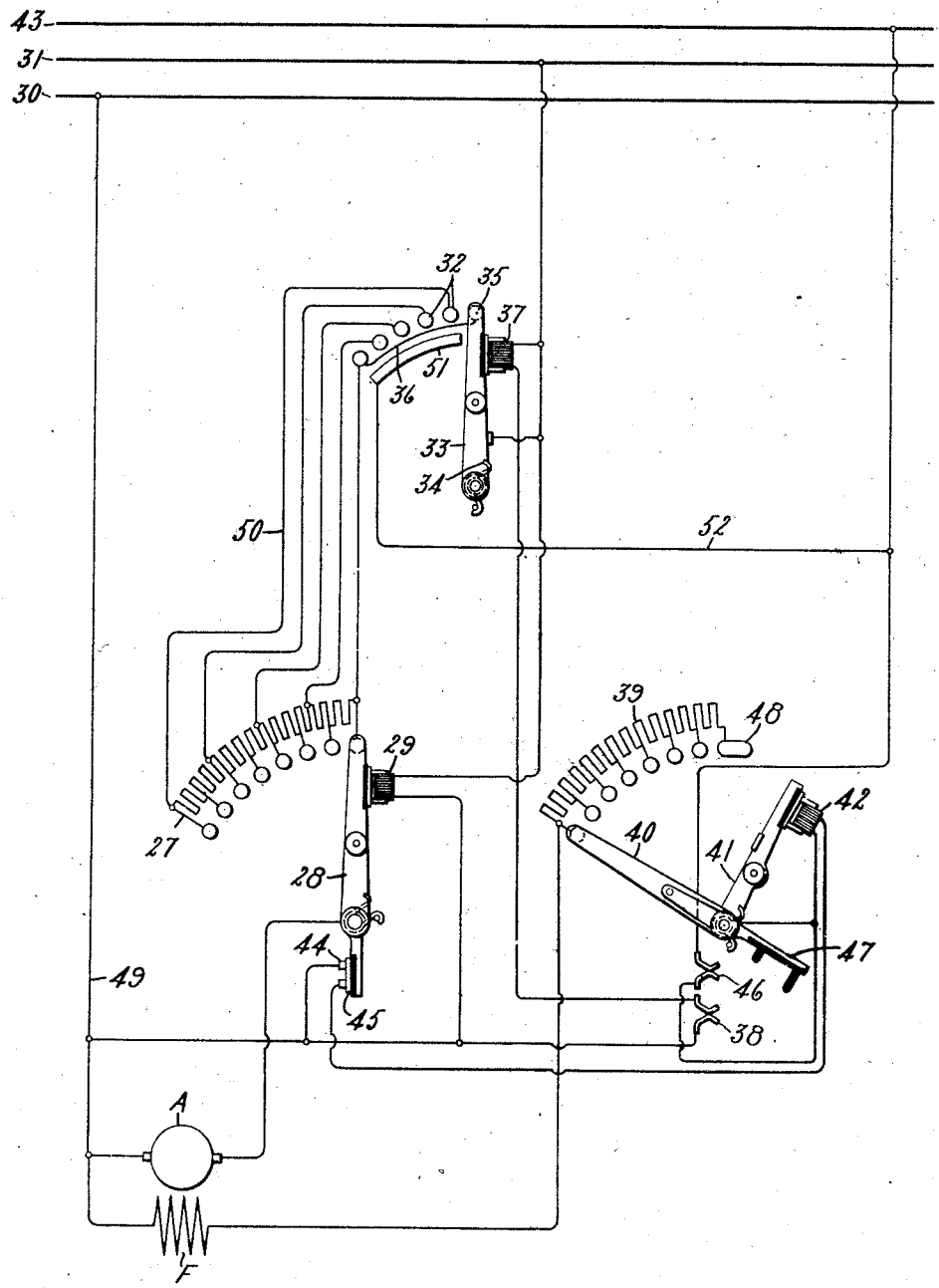

No. 854,743. PATENTED MAY 28, 1907.
A. KIDD, Jr.
MOTOR CONTROL DEVICE.
APPLICATION FILED JULY 25, 1906.

2 SHEETS—SHEET 1.

Witnesses

Inventor
Andrew Kidd, Jr.
by
Atty.

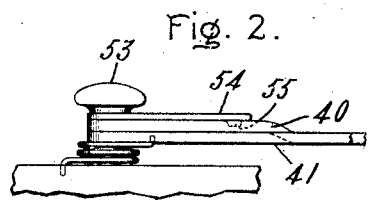
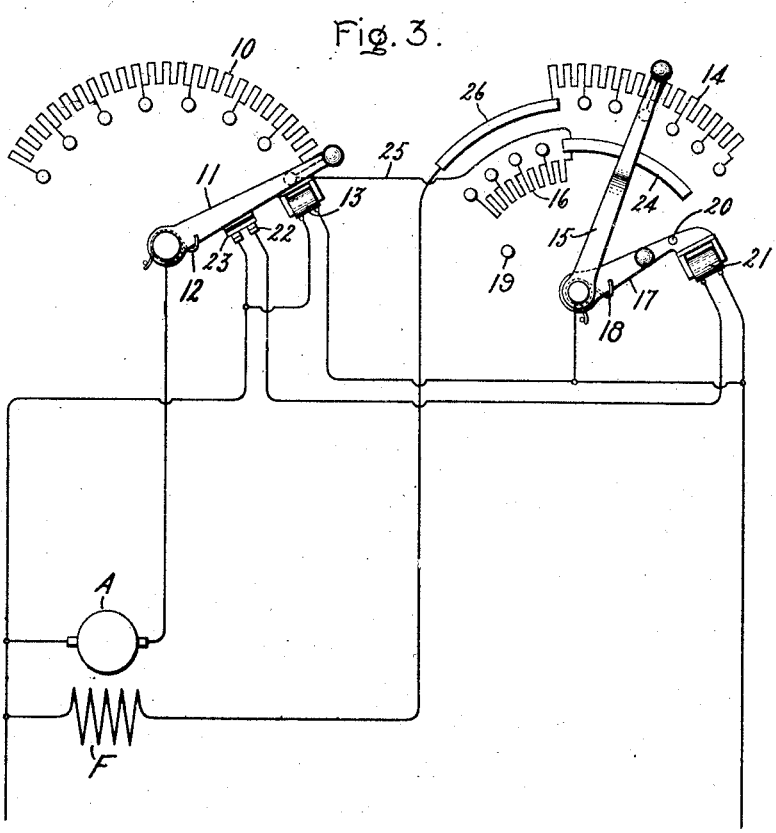

UNITED STATES PATENT OFFICE.

ANDREW KIDD, JR., OF SCHENECTADY, NEW YORK, ASSIGNOR TO GENERAL ELECTRIC COMPANY, A CORPORATION OF NEW YORK.

MOTOR-CONTROL DEVICE.

No. 854,743.     Specification of Letters Patent.     Patented May 28, 1907.

Application filed July 25, 1906. Serial No. 327,600.

*To all whom it may concern:*

Be it known that I, ANDREW KIDD, Jr., a citizen of the United States, residing at Schenectady, county of Schenectady, State of New York, have invented certain new and useful Improvements in Motor-Control Devices, of which the following is a specification.

This invention relates to the control of electric motor circuits and has for its object the provision of means whereby the motor may be brought up to running speed and the speed varied in a reliable, safe and efficient manner.

My invention relates more particularly to that type of control in which the motor is brought to running speed by cutting out armature resistance and the speed then varied by variation of field resistance.

One of the objects of my invention is to provide in combination with a starting rheostat, having a low-voltage release, a field rheostat for regulating the motor speed, the arrangement being such that it is impossible to vary the field resistance until running conditions are established. I also provide means whereby when the starting rheostat returns to off-position, the field rheostat will be automatically returned to the full field position.

While my invention is capable of a wide variation of uses and is in no sense limited to any particular system of distribution, I have for purposes of illustration shown it in connection with a multi-voltage system or more specifically the three-wire system. My invention adapts itself particularly well to starting motors on this system.

Another object of my invention, therefore, consists in providing improved means for starting an electric motor on multi-voltage system. In carrying out this later object, I provide starting mechanism and field control mechanism, the arrangement being such that the motor is first connected across the low-voltage mains, brought up to full speed by cutting out all the armature resistance and cutting in all of the field resistance. When the point of high speed at the lower voltage is reached, the motor is automatically connected across the high voltage mains at the same time the starting resistance is automatically cut into the armature circuit, and then the armature resistance is cut out simultaneously with the cutting out of the field resistance, thereby strengthening the field current at the same time that the armature current is weakened, thus maintaining substantially a constant speed while the motor is changed from the lower to the higher voltage.

In the accompanying drawings, Figure 1 shows my invention applied to a three-wire system of distribution; Fig. 2 shows a detailed view of the starting handle used on the field rheostat and Fig. 3 shows my invention applied to the ordinary two-wire system, the construction of the field rheostat being somewhat modified.

Referring first to Fig. 3 in which is shown my invention in its simplest form, 10 represents a resistance arranged to be connected in series with the motor armature A by means of the starting arm 11 biased to the off-position by a spring 12, in the usual manner. A no-voltage magnet 13, which I have shown connected across the line, is arranged to hold the arm 11 in short-circuited position. 14 is a resistance arranged to be connected in series with the motor field F by means of a controlling arm 15 while resistance 16 is in series with the starting resistance 10, for the purpose of reducing the speed of the motor after running conditions have been established, this resistance being also controlled by the arm 15. This arm 15 is arranged to be left in any position, and an arm 17 pivoted concentrically with the arm 15 is spring-pressed by means of spring 18, so that it will normally assume a position against the stop 19. The arrangement of the arms 15 and 17 is such that when the latter returns in response to its spring pressure, it carries the former with it by reason of the engagement of the pin 20 with the latter arm. The retaining magnet 21 is arranged to hold the arm 17 in such a position as to allow the arm 15 to reach the last stud of the resistance 14. This magnet is connected across the line and in shunt to the magnet 13, and has its circuit completed through a pair of contacts 22 by means of a contact strip 23 carried by but insulated from the arm 11. The contacts are arranged so that the circuit of the magnet 21 will be closed when the arm 11 reaches short-circuit position. The mode of operation of this form of my invention is as follows: The operator starts the motor by moving the controlling arm 11 to cut out the resistance 10 until it reaches the short-circuit position, and is held there by the magnet 13. In this position the circuit of the magnet 21 is closed at contacts 22. The arm 17 may now be moved to the right until it is held in the position shown in the drawing by the magnet 21. The speed of the motor may now be varied either by cutting in field resistance to increase the speed, or by cutting in armature resistance to decrease the speed by shifting the arm 15. The last stud of the starting resistance 10 is connected to the segment 24 by means of conductor 25, for keeping the armature resistance constant when the field is being varied, and a similar segment 26 is connected with the field so as to keep the field resistance constant while the armature resistance is being varied. By this arrangement it will be seen that it is impossible to vary the field resistance until the armature resistance is all cut out since the magnet 21 will not be energized so as to hold the arm 17 away from the controlling arm 15. Upon failure of voltage, the arm 11 will return to the off-position and the magnet 21 will be de-energized, releasing the arm 17 which carries the arm 15 to the full-field position.

In Fig. 1 in which I have shown a means of starting the motor on a three-wire system by use of my improved starting and field control mechanism, 27 is a starting resistance arranged to be connected in series with the motor armature A by means of the controlling arm 28 biased to the off-position in the usual manner, a no-voltage magnet 29 being connected across the low-voltage mains 30 and 31 on the three-wire circuit. The resistance 27 is provided with another series of contact studs 32 co-operating with a controlling arm 33, and also spring-pressed by the spring 34. A smaller number of studs is preferably provided and the arrangement is such that the first stud of the starting resistance 27 is connected with the last of the studs 32, so that as the arm 33 moves over the studs 32 in response to its spring tension, it will cut out resistance instead of cutting in resistance as does the arm 28 when similarly moved. The last stud 35 is connected with the first stud by means of conductor 36 so that when the arm 33 is on the stop 35, all of the resistance is cut out; while when it moves to the nearest intermediate stud 32 all of the resistance is in circuit. A retaining magnet 37 is arranged to hold the arm 33 on the stud 35, the circuit of this magnet being completed across the low-voltage mains through the normally closed contacts 38. The resistance 39 is arranged to be connected in the field circuit F by means of the controlling arm 40 in the usual manner while a spring-pressed arm 41 is arranged to return the arm 40 to full-field position when released by the retaining magnet 42. This magnet 42 is connected across the high-voltage mains 30 and 43, through the contacts 44 which are closed by a contact strip 45 when the arm 28 is in running position. A pair of normally closed contacts 46 are likewise connected in the circuit of the magnet 42, and the arm 40 is provided with a projection 47 having insulating fingers adapted to enter between the contacts 46 and 38 to break the circuits at these points. The mode of operation of this form of my invention is as follows: The operator moves the controlling arm 28 to cut out starting resistance 27 until it is held in short-circuited position by the magnet 29. In this position, the circuit of the magnet 42 is closed across the high-voltage mains at contacts 44 by a contact strip 45. The magnet 42 being energized, the operator moves the arm 41 until it is retained by this magnet and then moves the controlling arm 40 so as to cut resistance in series with the field to further speed up the motor. When the last stud 48 of the field resistance is reached, the magnet 42 is de-energized by the opening of the contacts 46, and magnet 37 is likewise de-energized by the opening of the contacts 38. The result is that as soon as the stud 48 is reached, the arm 41 is released carrying the controlling arm 40 back to the starting position. The de-energizing of the magnet 37 causes the arm 33 to move to the left and when it reaches the first stud 32, all of the resistance 27 is cut into circuit, the direction of current being as follows: from lead 49 through the armature A to arm 28 thence through the resistance 27 and conductor 50 to arm 33, segment 51 and conductor 52 back to the line 43, the armature being thus connected across the high-voltage mains with all of the resistance in circuit. The arm 33 continuing to move to the left, cuts out the resistance 27, the arm 28 being all the time held by magnet 29. At the same time the arm 33 is moving to the left and cutting out resistance so as to increase the armature current, the arm 40 is likewise moving to the left, increasing the field current thereby tending to keep the speed substantially constant during the change from low-voltage to high-voltage. The speed may then be further increased, if desired, by moving the arm 41 into contact with magnet 42 which has again become energized, and then varying the field resistance through the arm 40. In order to prevent the operator from holding the arm 40 when it is struck by the arm 41 and thus prevent its return to the starting position, I provide a compound operating arm which is shown in Fig. 2. In this arrangement the handle 53 is provided with a short spring arm 54 having a projection 55 fitted into a cavity in the arm 40. By this engagement between the handle 53 and the arm 40, the latter is moved over the contacts but when the arm 41 strikes the arm 40 it moves the latter away from the short arm 54 by the projection springing out of the cavity, carrying the arm 40 to the off-position, and leaving the handle undisturbed in the operator's hands.

It will thus be seen that I have provided effective means for starting motors and varying the speed thereof, and while I have shown a specific construction coupled with a particular mode of operation, it should be understood that I do not limit my invention excepting so far as is limited by the scope of the claims annexed hereto.

What I claim as new and desire to secure by Letters Patent of the United States is,—

1. The combination with an electric motor, of means for starting the same on a multi-voltage system comprising armature control mechanism, field control mechanism, means for retaining the former mechanism in running position across the low-voltage mains and means for automatically returning the same to starting position when the field control mechanism reaches a point of maximum speed.

2. The combination with an electric motor, of means for starting the same on a multi-voltage system comprising armature control mechanism, field control mechanism, means for retaining the former mechanism in running position across the low-voltage mains and means for returning both mechanisms to starting position simultaneously when the field control mechanism reaches the point of maximum speed.

3. The combination with an electric motor, of means for starting the same on a multi-voltage system comprising armature control mechanism, field control mechanism, means for retaining the former mechanism in running position across the low-voltage mains and means for connecting the motor to the high-voltage mains, with the armature resistance in circuit, when the field control mechanism reaches the point of maximum speed, and then simultaneously cutting out both resistances to maintain the motor at substantially constant speed during the change of voltage.

4. The combination with an electric motor, of means for starting the same on a multi-voltage system comprising armature control mechanism, field control mechanism, means for retaining the former mechanism in running position across the low-voltage means and means for automatically returning the same to starting position when the field control mechanism reaches a point of maximum speed and simultaneously connecting the motor across the high-voltage mains.

5. The combination with an electric motor, of means for starting the same on a multi-voltage circuit comprising armature resistance, a controlling element therefor, field resistance, a controlling element therefor, means for retaining the armature controlling element in running position, and means for automatically cutting the armature resistance in and out when the field resistance is at the point of maximum speed without moving the armature controlling element from running position.

6. The combination with an electric motor, of means for starting the same on a multi-voltage system comprising armature control mechanism, field control mechanism, means for retaining the former mechanism in running position across the low-voltage mains and means for returning the same first to starting position and then to running position when the field control mechanism reaches a point of maximum speed.

7. Means for controlling an electric motor circuit comprising armature control mechanism, means for retaining the same in short-circuit position, field control mechanism, means normally tending to return the same to full-field position, and means controlled by the armature control mechanism for rendering the said return means inoperative.

8. Means for controlling an electric motor circuit comprising armature control mechanism biased to the starting position, field control mechanism, means normally tending to return said latter mechanism to full-field position and means controlled by the armature controlling mechanism for rendering the said returning means inoperative.

9. Means for controlng an electric motor circuit comprising armature control mechanism, field control mechanism, means normally tending to return said latter mechanism to full-field position and a no-voltage magnet controlled by the armature controlled mechanism for controlling the returning means.

10. Means for controlling an electric motor circuit comprising armature control mechanism biased to the starting position, field control mechanism, means normally tending to return said latter mechanism to full-field position and a no-voltage magnet controlled by the movement of the armature control mechanism from running position for rendering the said returning mechanism inoperative.

11. Means for controlling an electric motor circuit comprising armature control mechanism biased to the starting position, a no-voltage magnet therefor, field control mechanism, means normally tending to return said latter mechanism to full-field position, and a no-voltage magnet controlled by the movement of the armature control mechanism from running position for rendering the said returning mechanism inoperative.

12. Means for controlling an electric motor circuit comprising armature control mechanism, field control mechanism, means normally tending to return said latter mechanism to full-field position and electrically controlled means responsive to movement of the armature control mechanism from running position for rendering the said returning means inoperative.

13. Means for controlling an electric motor circuit comprising armature control mechanism, field control mechanism, means normally tending to return said latter mechanism to full-field position and means responsive to movement of the armature control mechanism for controlling the returning means.

14. Means for controlling an electric motor circuit comprising armature resistance and independent controlling elements therefor, one of which is biased to running position and the other to starting position, means for retaining said elements in their respective operative positions, field control mechanism, and means controlled thereby for releasing one of said armature controlling elements.

15. Means for controlling an electric motor circuit comprising armature resistance and independent controlling elements therefor one of which has two running positions and is biased to one of them, means for maintaining said element in the other running position, field control mechanism and means controlled thereby for releasing said controlling element to allow it to return to the opposite running position.

16. Means for controlling an electric motor circuit comprising armature resistance having independent controlling elements, one of which is biased to starting position, the other having two running positions and biased to one of them, low-voltage magnet for retaining said elements in running position, field control mechanism, means controlled thereby for releasing said latter controlling element to allow it to return to its opposite running position.

17. Means for controlling an electric motor circuit comprising armature resistance having independent controlling elements, one of which has two running positions with an intermediate starting position and biased to one of said running positions, a no-voltage magnet for retaining said elements in running position, field control mechanism and means controlled by the movement of said mechanism to a predetermined position for releasing said controlling element to allow it to pass from running position through starting position back to the opposite running position.

18. Means for controlling an electric motor circuit comprising armature controlling mechanism having independent controlling arms, one of which is biased to starting position and the other having two running positions with an intermediate starting position and biased to one of them, field control mechanism, means normally tending to return said latter mechanism to full-field position, means responsive to movement of the field control mechanism to full-field position for releasing said latter element to allow it to pass from running position through the starting position back to the opposite running position, and means responsive to movement of the armature control mechanism to running position for rendering the returning means of the field control mechanism inoperative.

In witness whereof, I have hereunto set my hand this 20th day of July, 1906.

ANDREW KIDD, Jr.

Witnesses:
G. C. HOLLISTER,
HELEN ORFORD.